(12) United States Patent
Jeischik

(10) Patent No.: US 8,474,798 B2
(45) Date of Patent: Jul. 2, 2013

(54) AIR SPRING FOR VEHICLE

(75) Inventor: Joachim Jeischik, Wennigsen (DE)

(73) Assignee: Continental Aktiengesellschaft, Hannover (DE)

( * ) Notice: Subject to any disclaimer, the term of this patent is extended or adjusted under 35 U.S.C. 154(b) by 865 days.

(21) Appl. No.: 12/376,242

(22) PCT Filed: May 25, 2007

(86) PCT No.: PCT/EP2007/055075
§ 371 (c)(1),
(2), (4) Date: Feb. 3, 2009

(87) PCT Pub. No.: WO2008/015034
PCT Pub. Date: Feb. 7, 2008

(65) Prior Publication Data
US 2010/0237549 A1    Sep. 23, 2010

(30) Foreign Application Priority Data
Aug. 3, 2006  (DE) .................. 10 2006 036 248

(51) Int. Cl.
*F16F 5/00*        (2006.01)
*F16F 9/04*        (2006.01)
*F16F 9/342*       (2006.01)

(52) U.S. Cl.
USPC .............. 267/122; 267/64.19; 267/64.21; 267/64.23; 267/64.24; 267/64.27

(58) Field of Classification Search
USPC ............ 267/122, 64.19, 64.21, 64.23, 64.24, 267/64.27
See application file for complete search history.

(56) References Cited

U.S. PATENT DOCUMENTS

| 3,186,885 | A | * | 6/1965 | Iles | 156/132 |
| 4,722,516 | A | * | 2/1988 | Gregg | 267/64.27 |
| 5,253,850 | A | * | 10/1993 | Burkley et al. | 267/64.24 |
| 5,286,010 | A | * | 2/1994 | Pahl et al. | 267/64.24 |
| 6,536,749 | B1 | * | 3/2003 | Luhmann et al. | 267/64.19 |
| 2003/0127781 | A1 | * | 7/2003 | Fritz | 267/64.24 |
| 2007/0257409 | A1 | | 11/2007 | Szyszka et al. | |

FOREIGN PATENT DOCUMENTS

| DE | 1217600 | 5/1966 |
| DE | 10200405189 | 4/2006 |
| WO | 2004067989 | 8/2004 |
| WO | WO 2004067989 A1 * | 8/2004 |

* cited by examiner

*Primary Examiner* — Joanne Silbermann
*Assistant Examiner* — Syed A Islam
(74) *Attorney, Agent, or Firm* — Brinks Hofer Gilson & Lione

(57) ABSTRACT

An air spring has at least one working space which is filled with compressed air and which is delimited at least partially by a rolling bellows which is fastened at its ends to connecting parts. At least one of its ends, the air spring has a wall which is thicker in relation to the rest of the rolling bellows body, wherein the rolling bellows has, at least one of its thickened ends, a continuously vulcanized layer cover which is folded back to such a length that, after the assembly of the air spring, at least one region of the rolling bellows which is highly loaded by chassis forces falls into the region of the layer cover.

4 Claims, 2 Drawing Sheets

AIR SPRING FOR VEHICLE

BACKGROUND OF THE INVENTION

The invention relates to an air spring or an air damper for the chassis of vehicles, the air spring comprising at least one working chamber filled with compressed air which is at least partially delimited by a rolling bellows, the rolling bellows rolling at least partially on rolling contours, being fastened at its ends by a frictional and/or positive connection to connecting parts and being partially provided at least one of its ends with a wall which is thicker in relation to the remainder of the rolling bellows body and/or with additional material layers.

Rolling bellows of air springs are subjected to high loads by clamping forces, not only at the clamping points but also in the regions where the rolling bellows have to absorb forces acting perpendicular to their axis, namely wheel guiding forces. Such forces cause a slight deflection of the bellows perpendicular to its axis and thus subject the "free" cross sections of the rolling bellows outside the clamping regions to load. This may become problematic in the case of thin-walled rolling bellows.

Thin-walled rolling bellows are, however, often desired in order to increase comfortable suspension characteristics and to reduce so-called harshness behavior. The person skilled in the art understands the term "harshness" as somewhat rough, hard suspension characteristics, superimposed in the event of vibrations of higher frequency and lower amplitude, which depend on the design, materials, intrinsic damping, inertia, etc. which are customary for air spring units and damper units.

With regard to the clamping forces which are critical for thin-walled rolling bellows, WO 2004/067989 A1 discloses an air spring comprising a rolling bellows in which both end regions are provided with short folded-up layers and/or are folded back or "turned up". This folding-back takes place, however, only after the vulcanization of the rolling bellows. In a rolling bellows which is as thin-walled as possible and thus comfortably resilient, the reason for this folded-up portion is that the rolling bellows in the clamping region is intended to be thickened, i.e. doubled-up at the connecting parts, namely in the clamping region of the cover or the roll-off piston. This is necessary, in turn, with a thin-walled bellows, so as not to risk any material damage by pinching as a result of the clamping rings in the event of high clamping forces. In this air spring, the folded-up layer is attached to the bellows only after the vulcanization of the bellows and only in the clamping region. The remaining length of the rolling bellows is not reinforced.

In order to achieve the required strength even with thin wall thicknesses, rolling bellows are generally manufactured as fabric-reinforced, rubber bellows, a plurality of fabric or cord layers being able to be arranged superimposed over one another in the rubber matrix of the rolling bellows, the fibers thereof surrounding the rolling bellows at different angles. Often, layers with fibers which cross over one another (relative to the finished rolling bellows) are used.

A further possibility for achieving comfortable suspension characteristics and reduced "harshness" with thinner-walled rolling bellows, is to provide the rolling bellows and/or the air springs or air dampers with so-called external guides, namely with a tubular "supporting structure" or supporting body surrounding the rolling bellows. Thus, for example, a thin-walled rolling bellows may be surrounded by a thin-walled light metal tube as a supporting body.

The external guides may, in this case, be directly connected to the air spring cover so that the rolling bellows, on the one hand, may roll on the outside of the roll-off piston and, on the other hand, on the inner surface of the external guide. The difference remaining between the internal diameter of the external guide and the external diameter of the roll-off piston is thus relatively small for the rolled fold. Thus the problem arises that hardly any forces acting perpendicular to the axis of the rolling bellows are able to be absorbed, as even the slightest deflection of the bellows in the intermediate space (internal diameter of the external guide—external diameter of the roll-off piston) may already permanently damage the rolling bellows.

A solution for this technical problem is for the external guide not to be fastened to the air spring cover but at a slight distance therefrom on the rolling bellows as such. This is carried out, for example, by a clamping ring on the inner face of the rolling bellows, which clamps the external guide surrounding the rolling bellows at its upper end fixedly to the rolling bellows. The vertical distance between the air spring cover and the external guide i.e. the subsection of the rolling bellows in the vicinity of the cover not surrounded by the external guide, may now be used as a "joint", which permits the pivotability of the air spring bellows in spite of the external guide and thus in turn allows the deflections produced by forces acting perpendicular to the axis of the rolling bellows. In the specialist field this subsection of the rolling bellows is referred to as the "cardanic fold" or "cardanic joint".

Naturally this cardanic fold is subjected to high loads, so that for partial reinforcement of the rolling bellows during its production, additional material layers, namely fabric and/or rubber layers are already provided in the region of the cardanic fold produced subsequently to, and as a result of, the assembly of the air spring. The application of additional fabric and/or rubber layers is, however, only possible when manufacturing the rolling bellows individually and is also associated with a considerable additional manufacturing cost. Hitherto, with continuous manufacture from a rolling bellows "strand" there was only the possibility either of dispensing with a reinforcement of the cardanic fold or, alternatively, reinforcing the entire rolling bellows strand. The latter is undesirable, as already disclosed above, for reasons of comfort and "harshness".

The object of the invention, therefore, is to provide an air spring or an air damper with a rolling bellows which is as thin-walled as possible, which may be made in a continuous production process, and which nevertheless has reinforcements or wall thickening in individual regions.

SUMMARY OF THE INVENTION

This object is achieved by a rolling bellows that has, on at least one of its reinforced ends, at least one continuously vulcanized folded-up layer, which is folded back to such a length that, after the assembly of the air spring, at least one region of the rolling bellows, which is subjected to high loads by chassis forces, falls within the region of the folded-up layer.

In this case, the rolling bellows has on at least one of its reinforced ends at least one continuously vulcanized folded-up layer, which is folded back to such a length and vulcanized that after the assembly of the air spring at least one region of the rolling bellows, which is subjected to high loads by chassis forces, falls within the region of the folded-up layer. The folded-up layer is thus formed in the production of the rolling bellows before vulcanization, whereby a continuously vulcanized air spring wall is produced with a reinforcing element structure fixed in the rubber matrix via the wall thickness of the bellows. Such a high-strength folded-up layer may be formed both in individually manufactured rolling bellows and also in continuously manufactured rolling bellows and is turned back/folded back with a high degree of accuracy only as far as the regions generally located in the vicinity of one end of the rolling bellows which are subjected to particularly high loads. As a result, on the one hand, comfortable suspension characteristics and reduced "harshness" are achieved with thin-walled rolling bellows and, on the other hand, sufficient strength is achieved in regions subjected to high loads by a specific and vulcanized folded-up layer. It is also conceivable that, with particularly thin-walled rolling bellows, two folded-up layers are formed superimposed over one another—and thus successive folded-up layers during production. In any case, during production the rolling bellows is subjected to complete vulcanization when exposed to heat after the folded portion(s) are formed.

One advantageous development is that the air spring has an external guide which is fastened to the rolling bellows and spaced apart from a connecting part, the folded-up layer is arranged at the end of the rolling bellows located in the vicinity of the fastening of the external guide and is folded back to such a length that, after assembly of the air spring, the region of the rolling bellows between the connecting part and the external guide falls within the region of the folded-up layer. Thus the wall thickness of the rolling bellows, in the sense disclosed above, may be further improved and only the region of the so-called "cardanic fold" between a connecting part and the external guide may be specifically reinforced.

A further advantageous development is that the folded-up layer extends as far as the fastening region of the external guide. Thus the reinforcement produced by the folded-up layer may additionally be used for the reinforcement of the clamped region of the rolling bellows between the external guide and the internal clamping ring.

A further advantageous development is that the folded-up layer is formed inwardly. As a result, with rolling bellows made up of specific combinations of layers, a particularly smooth and uniform transition between reinforced regions and the remaining regions of the rolling bellows is produced after vulcanization.

A further advantageous development is that the folded-up layer extends over the entire length of the rolling bellows. This may occur when the bellows blank is intended to be of particularly thin-walled design for manufacturing or structural reasons. Such a rolling bellows obtains its actual structural wall thickness as well as its reinforced regions by the—possibly multiple—folded-back or folded portions.

The invention is intended to be described in more detail with reference to an embodiment.

DETAILED DESCRIPTION OF THE DRAWINGS

Figure 1:
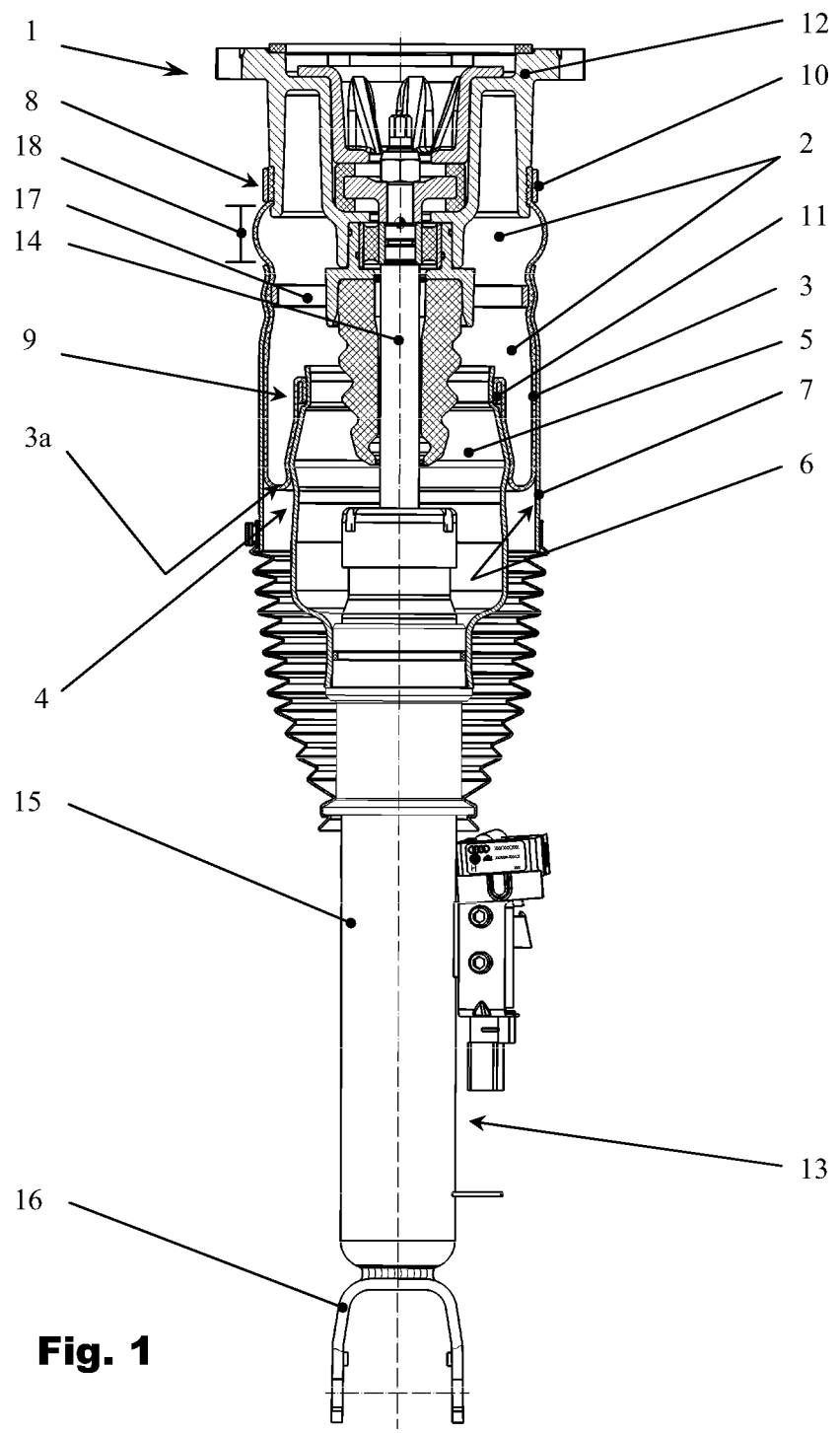
FIG. 1 shows an air spring for a motor vehicle according to the invention.

FIG. 1 shows an air spring 1 for a motor vehicle, which has a working chamber 2 filled with compressed air, which is at least partially delimited by the rolling bellows 3, which forms a rolled fold 3*a*. When the vehicle experiences spring compression and spring extension, the rolling bellows 3 rolls both on the rotationally symmetrical contour 4 of the roll-off piston 5 and on the inner surface 6 of the external guide 7. At its ends 8, 9 the rolling bellows is fastened to the connecting parts by clamping rings 10, 11, namely with its upper end to the air spring cover 12 and with its lower end to the roll-off piston 5.

The air spring 1 has a centrally arranged hydraulic damper 13, the piston rod 14 thereof being connected via and by the air spring cover 12 to the bodywork, not shown here in more detail, and the damper cylinder 15 via the lower connecting flange 16 to a wheel support of the chassis, also not shown in more detail.

In air dampers, i.e. in systems in which both the suspension and the damping takes place pneumatically, the hydraulic damper is, moreover, replaced by a second working chamber, the damping chamber, which is connected to the working chamber 2 via flow valves.

The external guide 7 is fastened directly to the rolling bellows 3 at a distance from the air spring cover 12. This is carried out by the clamping ring 17 on the inner face of the rolling bellows 3, which fixedly clamps the external guide 7 surrounding the rolling bellows at its upper end. The distance between the air spring cover 12 and the upper edge of the external guide 7 i.e. the subsection 18 of the rolling bellows 3 in the vicinity of the cover not surrounded by the external guide forms the "cardanic fold".

Figure 2:
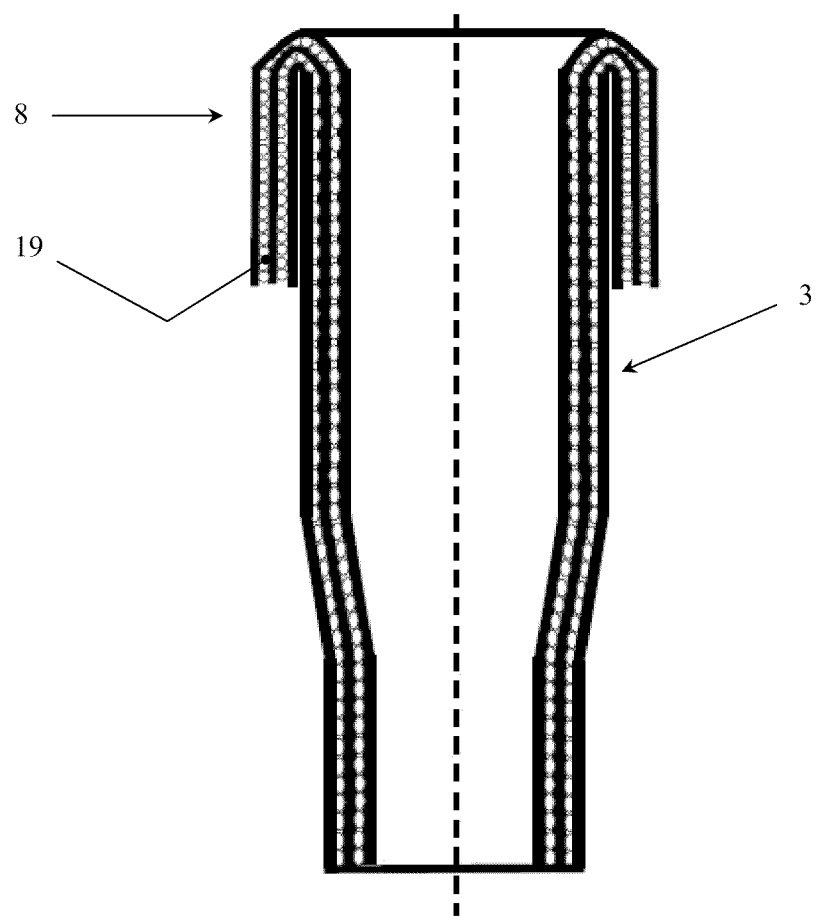
FIG. 2 shows the rolling bellows of the air spring shown in FIG. 1 in the form of a basic sketch.

FIG. 2 shows the rolling bellows 3 of FIG. 1 in the form of a basic sketch. In this case, the rolling bellows has at its end located in the vicinity of the air spring cover 12 a reinforced part, namely a folded-up layer 19, which is folded-back outwardly and vulcanized. The folded-up layer 19 is folded back to such a length that, after assembly of the air spring, the folded-up layer 19 extends as far as the fastening region of the external guide 7 i.e. as far as below the clamping ring 17.

LIST OF REFERENCE NUMERALS (Part of the Description)
1 Air spring
2 Working chamber
3 Rolling bellows
3*a* Rolled fold
4 Rotationally symmetrical contour
5 Roll-off piston
6 Inner surface of the external guide
7 External guide
8 Upper rolling bellows end
9 Lower rolling bellows end
10 Clamping ring on the air spring cover
11 Clamping ring on the roll-off piston
12 Air spring cover
13 Hydraulic damper
14 Piston rod
15 Damping cylinder
16 Connecting flange
17 Clamping ring for external guide
18 Cardanic fold
19 Folded portion

The invention claimed is:

1. An air spring comprising at least one working chamber adapted to be filled with compressed air and at least partially delimited by a rolling bellows, the rolling bellows having portions rolling on an outer contour of a roll-off piston and portions rolling on an inner contour of a rigid external guide and being fastened at a first end to the roll-off piston and at a second end to a connecting part, with an axial gap extending between the external guide and the connecting part, the rolling bellows having a subsection with a first layer covering the axial gap, the subsection forming a cardanic fold, wherein the rolling bellows has at least one continuously manufactured folded-up layer of identical material as the portions rolling on the outer contour of the roll-off piston, the folded-up layer being arranged proximate the second end and extending across the entire axial gap, thereby forming a second layer of the subsection covering the axial gap, the first and second layers permanently adhering to each other and forming a reinforcing element structure fixed in a rubber matrix via a wall thickness of the rolling bellows.

2. The air spring as claimed in claim 1, wherein the folded-up layer extends as far as a fastening area of the external guide.

3. The air spring or air damper as claimed in claim 1, wherein the folded-up layer is folded outward.

4. The air spring or air damper as claimed in claim 1, wherein the folded-up layer extends over the entire length of the rolling bellows.

* * * * *